United States Patent

[11] 3,559,831

| [72] | Inventor | William A. Weston<br>Lanarkshire, Dunalastair, Crawford, Scotland |
|---|---|---|
| [21] | Appl. No. | 725,064 |
| [22] | Filed | Apr. 29, 1968 |
| [45] | Patented | Feb. 2, 1971 |
| [32] | Priority | Apr. 27, 1967, May 26, 1967, Nov. 3, 1967, Mar. 27, 1968 |
| [33] | | Great Britain |
| [31] | | 19,366/67, 24,498/67, 50,061/67 and 14,831/68 |

[54] GOODS VEHICLES
17 Claims, 27 Drawing Figs.

[52] U.S. Cl.................................................. 214/518,
214/75, 214/83.36; 198/181; 214/516
[51] Int. Cl..................................................... B60p 1/44
[50] Field of Search............................................ 214/518,
83.36, 75T, 516; 198/181

[56] References Cited
UNITED STATES PATENTS

| 2,521,727 | 9/1950 | Kappen | 214/518 |
| 2,530,341 | 11/1950 | Satsky | 214/75(T) |
| 2,709,014 | 5/1955 | Soles | 214/518 |
| 3,204,797 | 9/1965 | Chandler | 214/518 |
| 3,313,430 | 4/1967 | Gwinn | 214/75(T) |

Primary Examiner—Albert J. Makay
Attorney—Young & Thompson

ABSTRACT: A van has on its load carrying platform an endless conveyor extending fore-and-aft, and wheeled containers connected to the conveyor and running on the platform. The conveyor is mounted on the platform so that it can be moved bodily rearwardly during loading and unloading, and can be moved forwardly when it is not being operated, and the containers overhang the conveyor, so that substantially the whole cargo space is utilized.

Inventor
WILLIAM AUGUSTUS WESTON
By Young & Thompson
Attorney

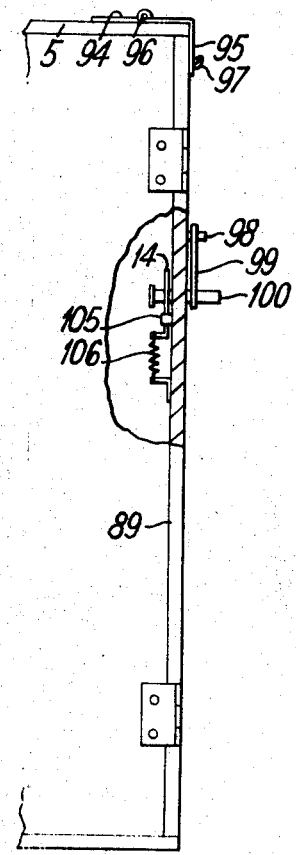
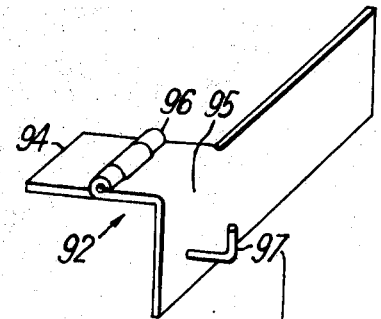
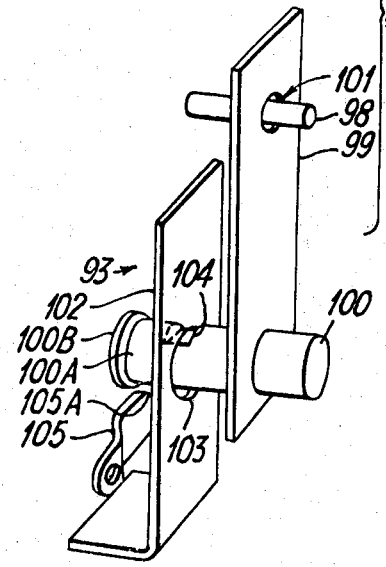
Fig. 25.
Fig. 26.

GOODS VEHICLES

This invention relates to goods vehicles. As the invention relates, especially but not exclusively, to road vehicles, such as to lorries and vans, it will be assumed for convenience of description that the vehicle is a van.

According to the present invention I provide a van having on its load carrying platform an endless conveyor extending fore-and-aft and having side-by-side runs, and having attached to its endless member a series of wheeled carriers or a series of devices to each of which a wheeled container may be connected.

Preferably, the van has a tailgate which can be raised and lowered bodily so as to act as a lift.

Preferably also, the conveyor is position adjustable bodily in the fore-and-aft direction relative to the platform of the van.

Further, according to the present invention I provide in or for a van a gate lift comprising a gate, a vertically arranged piston and cylinder unit adapted to raise and lower the gate through a rope and pulley or the like system, a telescopic ground engageable support, the cylinder of said unit being mounted in the upper tubular part of a telescopic member so as to be slidable between an upper limit position, and a lower limit position in which it urges the other part of the tubular member into a ground engaging position, and means for releasably locking the piston of the unit against movement and said other part of the telescopic member in its ground engaging position.

Said support may be another and similar piston and cylinder unit, or may be a telescopic leg which is pivotal between a lowered ground engaging position and a raised out-of-use position in which it extends across and below the gate and supports the latter or acts as a safety catch therefor.

Preferably, each container has two fixedly mounted front wheels and one or more caster-type rear wheels, and each carrier has means thereon, for example rollers, for engaging the container and raising its front end so that its front wheels lie clear of the platform of the van, and the container is supported, when on the conveyor, by front castor-type wheels on the carrier and by the rear castor-type wheel or wheels on the container.

Still further, according to the present invention I provide a container having a door and means for the purpose aforesaid, said means comprising a device for holding the door closed and displaceable so as to permit opening of the door and carrying a connector for one end of a sealing strip, and a releasable fastener for the other end of the sealing strip, said device with its connector and said fastener being so arranged on the container that, when they are connected by a sealing strip, the latter extends across the free end of the door, and said device being displaceable only in a direction away from said fastener to permit opening of the door, and the fastener being releasable only from inside the container, so that the door cannot be opened without the sealing strip being broken.

Embodiments of the invention will now be described, by way of example, with reference to the accompanying drawings, in which:

FIGS. 4 to 27 are views showing details and modifications of the van of FIGS. 1, 2 and 3.

Figure 1:
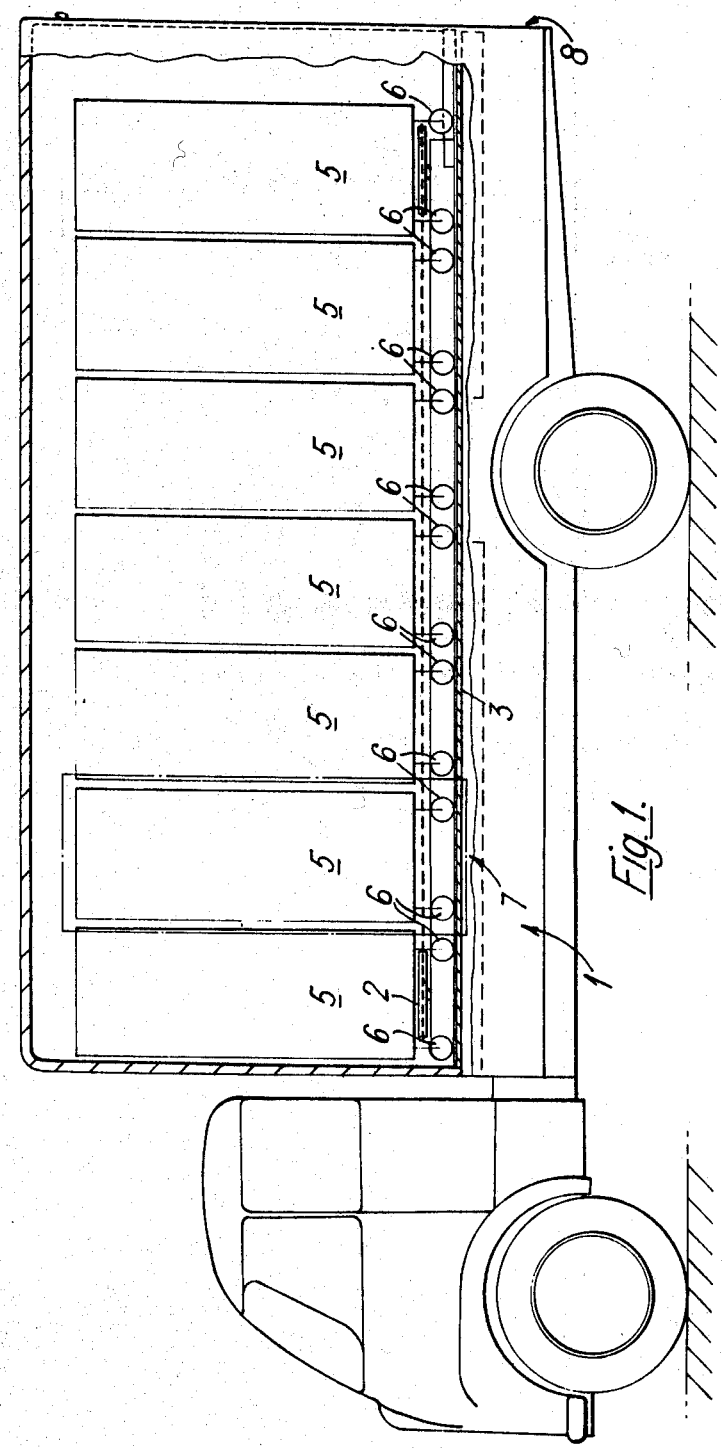
FIG. 1 is a sectional side view of a van according to the present invention.
Figure 2:
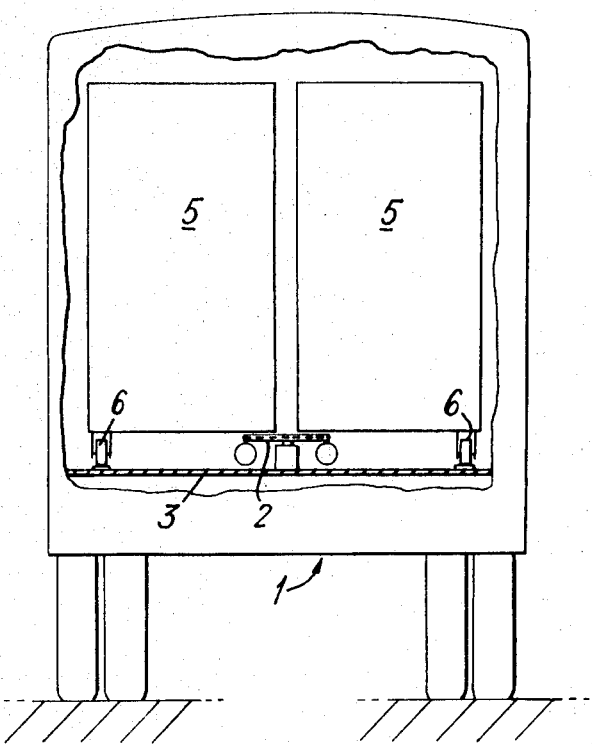
FIG. 2 is an end view corresponding to FIG. 1.
Figure 3:
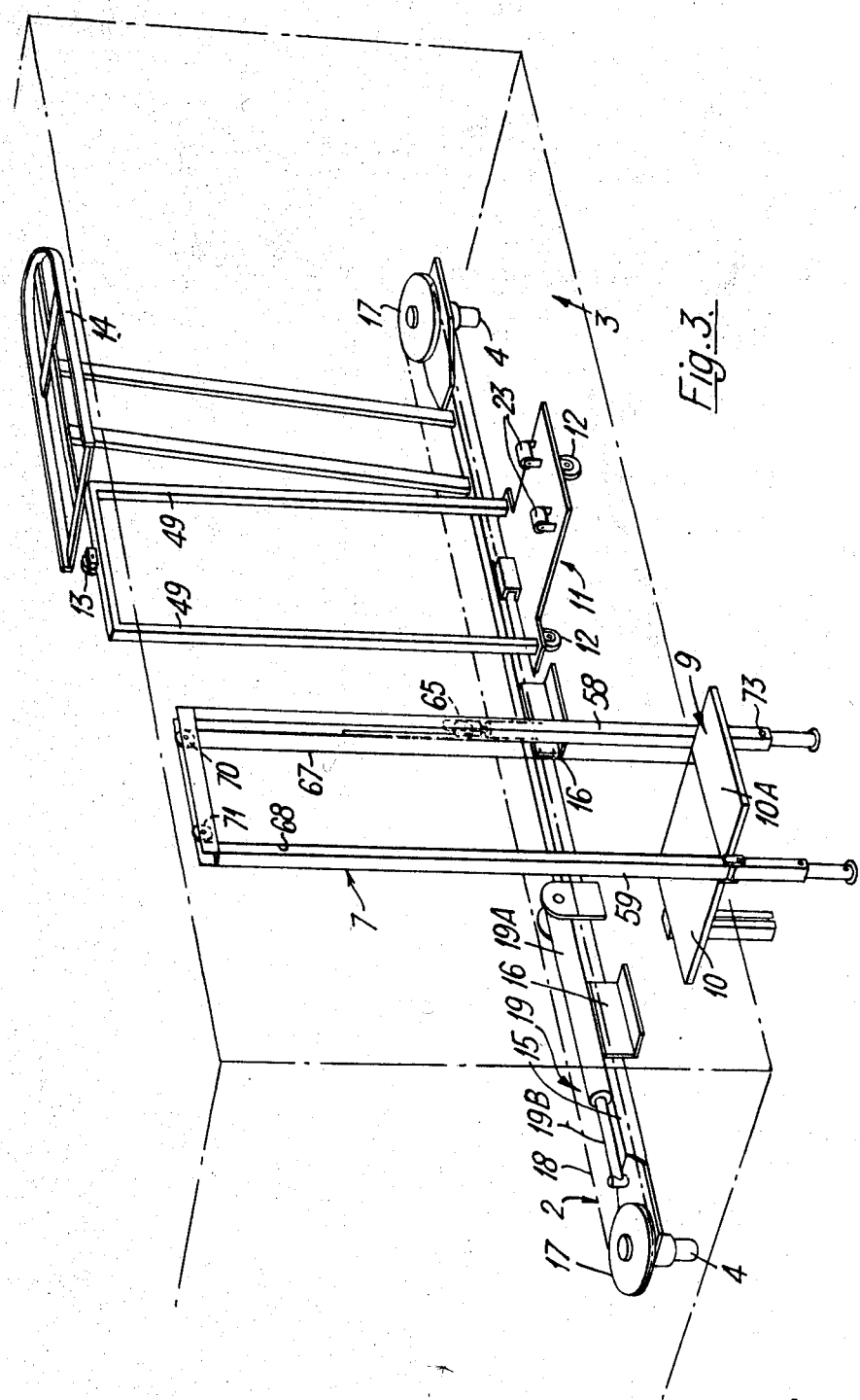
FIG. 3 is a perspective view of part of the van of FIG. 1.

Referring now to FIGS. 1 to 3, a van 1 has an endless chain conveyor 2 mounted on its load carrying platform 3. The conveyor 2 extends fore-and-aft of the van 1 and the chain has side-by-side runs. Two hydraulic motors 4 powered by an electrical pump (not shown) drive the conveyor 2 and the latter carries a plurality of containers 5 (not shown in FIG. 3) mounted on castor-type wheels 6.

The van 1 has a gate lift 7 at one side and a tail gate 8 at the rear. The floor 9 of the gate lift 7 is formed by a portion 10 of the platform 3 and a hinged portion 10A. The floor 8 is movable from a raised position, as shown in FIG. 3, in which it is flush with the platform 3, and a lowered position in which it is substantially at ground level.

The containers 5 are connected to the conveyor 2 through carriers 11 on the conveyor chain and mounted on castor-type wheels 12 which run on the platform 3.

The general principle of operation of the van is as follows. In order to load the van with containers 5 the lift 7 is moved to its lowered position and a container is pushed on to the floor 10, 10A. The lift 7 is then raised until the floor 10, 10A is flush with the platform 3 and the container is pushed onto and secured to a carrier 11. The conveyor 2 is then operated until the next carrier 11 is opposite the gate lift 7 and the preceding carrier 11 is moved along the van. This procedure is carried out with each container until the van is fully loaded, as shown in FIGS. 1 and 2.

Unloading is effected in the reverse manner to that above described.

It will be understood that there must be space available at the front and rear of the van in order that the containers 5 may swing around the ends of the conveyor 2. As such space is valuable in goods vehicles, the conveyor is slidably mounted on the platform 3 so that, during loading and unloading and with the tailgate 8 open, the conveyor 2 is moved rearwardly of the van 1. Thus the containers swing clear of the front wall of the van 1 as they swing around the front end of the conveyor 2 and out of the open tailgate 8 as they swing around the rear end of the conveyor 2. When the carriers 11 approach the rear end of the conveyor 2 a flanged wheel 13 engages a substantially U-shaped rail 14 which supports the carrier 11 and associated container 5 when the wheels 6 and 12 run clear of the rear of the platform 2. Alternatively or additionally the tailgate 8 may be hinged downwardly so as to form an extension of the platform 3 on which the wheels 12 and 6 may run. When loading or unloading is completed the conveyor is moved forward to the position shown in FIGS. 1 to 3.

The conveyor 2 includes a beam 15 extending fore-and-aft of the van 1 and slidable in fixed bearing members 16. The hydraulic motors 4 are secured to opposite ends of the beam 15 and are drivingly connected to sprocket wheels 17 around which passes an endless chain 18. A hydraulic piston and cylinder unit 19 has its cylinder 19A connected to the platform 3 by lugs 20 and its piston rod 19B connected to the beam 15. Thus actuation of the unit 19 by fluid from the electrical pump which drives the motors 4 moves the conveyor 2 bodily, either rearwardly or forwardly, as described above.

Figure 4:
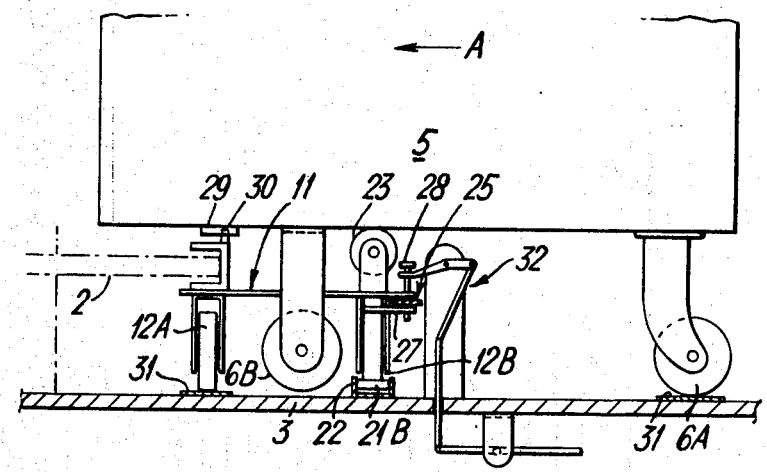
Figure 5:
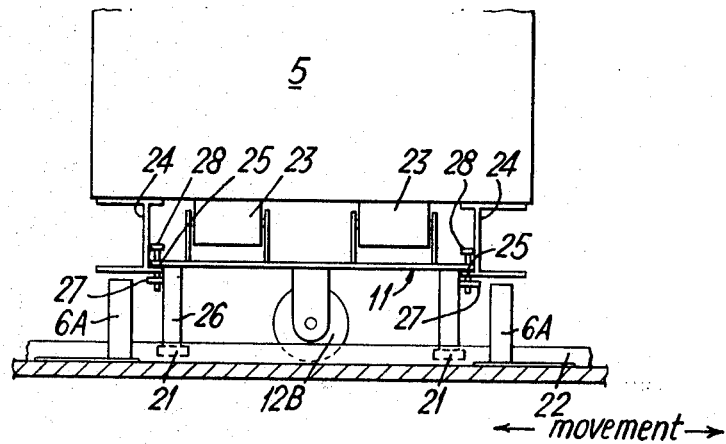

The carriers 11, details of which are shown in FIGS. 4 and 5, are pivotally connected to the chain 18 by extended link pins (not shown) and each carrier 11 has a pair of front or inner castor wheels 12A and a pair of rear or outer rollers 21 running in outer tracks 22 which extend along each side of the conveyor 2 but not around the ends. Each carrier 11 also has a rear wheel 12 b which is fixed against swiveling and which runs on the base of the track 22 at least when the carriers are unloaded. Alternatively, other tracks or strips may be provided for the wheels 12B. Adjacent its rear or outer end, the carrier 11 supports on top thereof a pair of rollers 23.

Each container 5 has a pair of rear castor wheels 6A and a pair of front wheels 6B which are fixed against swiveling. The container also has at opposite sides runners 24 extending fore-and-aft and each having a flange 25, and supports 26 for the rollers 21 present flanges 27.

Figure 6:
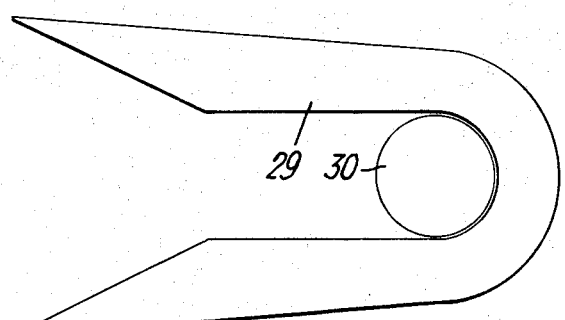

In use, when a container 5 is to be loaded, it is pushed in the direction of the arrow A, FIG. 4, so that the runners 24 pass along each side of the carrier 11, and each flange 25 passes between the carrier 11 and a flange 27. The floor of the container rides on the rollers 23, so that the container 5 is raised at the front, and its front wheels 6B are lifted clear of the platform 3. By the time the container 5 has reached its loaded position, as shown in FIG. 4, the flanges 25 have abutted the carrier 11 and pivoted it upwards slightly about its connection to the conveyor chain 18. Also, when the container 5 reaches the position shown in FIG. 4, pins 28 on the carrier 11 are spring urged through aligned holes in the flanges 25 and 27, and a slotted guide member 29 on the container 5 has fully engaged a post 30 on the carrier 11. The member 29 and the post 30 are shown in plan view to a larger scale in FIG. 6, and these assist in guiding the container 5 into position. The container 5 is thus held against sidewise movement relative to the carrier 11 by the abutting flanges 25, 27 and the pin 30 engaging in the member 29, and is held against movement beyond the position shown and against withdrawal by the pins 28. In the loaded position shown in FIG. 4, the container is thus supported on the castor wheels 12A and 12B of the carrier 11 and on its own castor wheels 6A, which run on strips 31 on the platform 3, when the conveyor is in operation.

A manually operable lever system generally indicated at 32 is provided for withdrawing the pins 28 from the holes in the flanges 25 and 27, so that the container 5 may be withdrawn for unloading. Alternatively, the lever system may be operable to effect insertion of the pins 28, and the pins 28 withdraw under spring pressure when the lever system is again operated.

Figure 7:
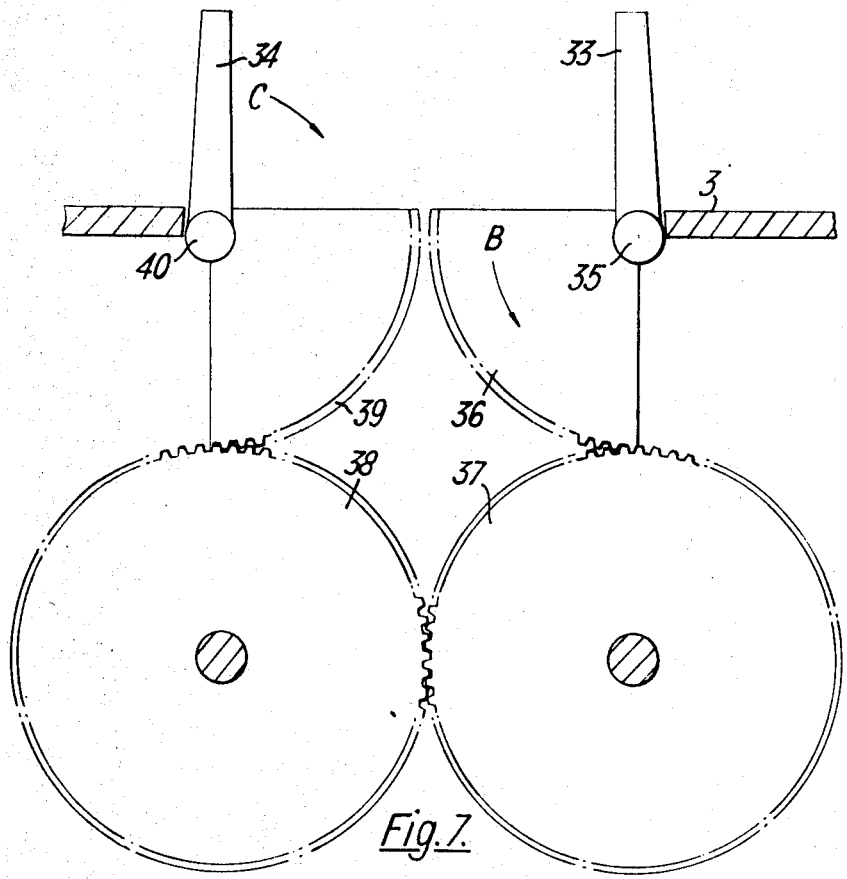

The sidewalls of the track 22 project above the platform 3 and provision is made to facilitate movement of the wheels 6B over the track 22, as will now be described with reference to FIG. 7. The walls of the track 22 have opposed portions 33, 34 which act as gates which can be swung downwards to allow the wheels 6B to pass over the track. The gate 33 is mounted at its lower end on a pivot 35 and is attached to a gear segment 36 which meshes with a gear wheel 37 which in turn meshes with a gear wheel 38. The latter meshes with a gear segment 39 to which the gate 34 is attached and the gate 34 is mounted at its lower end on a pivot 40. Thus, when the container 5 is being pushed to its loaded position, the wheels 6B push down the gate 33. The segment 36 is thus rotated in the direction of the arrow B causing the gear wheels 37, 38 to rotate, and the segment 39 to rotate so that the gate 34 swings down in the direction of the arrow C. Springs, not shown, are provided to return the gates 33, 34 to the upstanding position as soon as the wheels 6B have passed the track 22. During withdrawal of the container 5, a similar action takes place when the wheels 6A push down the gate 34.

Figure 8:
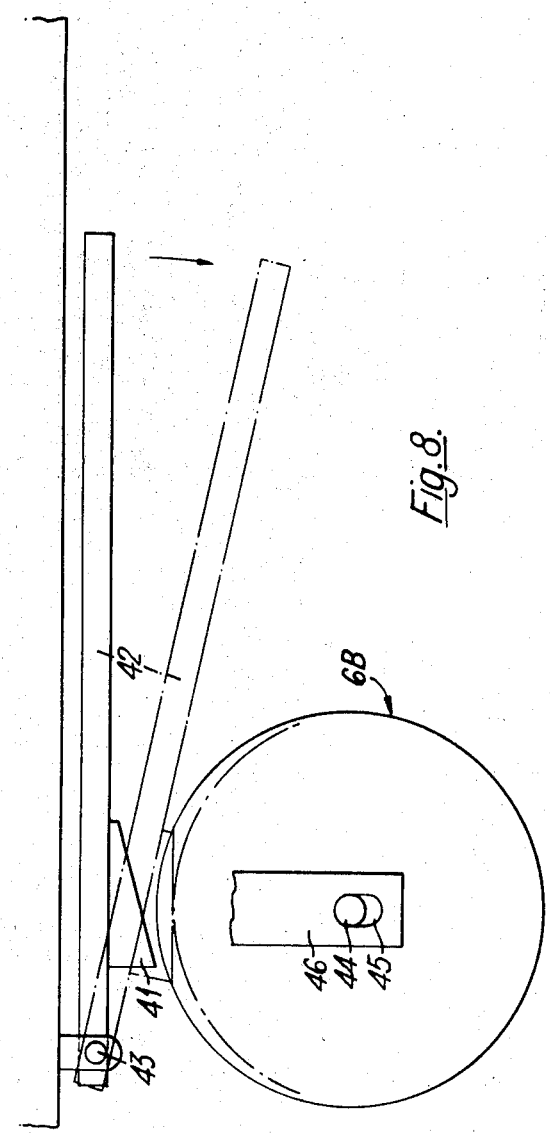

FIG. 8 illustrates a braking device for the container which will now be described. The braking device consists of a brake block 41 on a lever 42 which is pivotally mounted on the container at 43 and is engageable with a wheel 6B. The shaft 44 of the wheel 6B is mounted in vertically elongated slots 45 in a bracket 46 for the wheel 6B. When the lever 42 is swung down to the operative position, shown in broken lines in FIG. 8, the block 41 engages the wheel 6B and the front end of the container rises relative to the wheel 6B, and the lever 42 is secured in position in any convenient manner, for example, by a pawl and ratchet device. The floor of the container 5 when the brake is applied, is horizontal, and when the brake is released is slightly inclined downwardly and forwardly.

Figure 9:
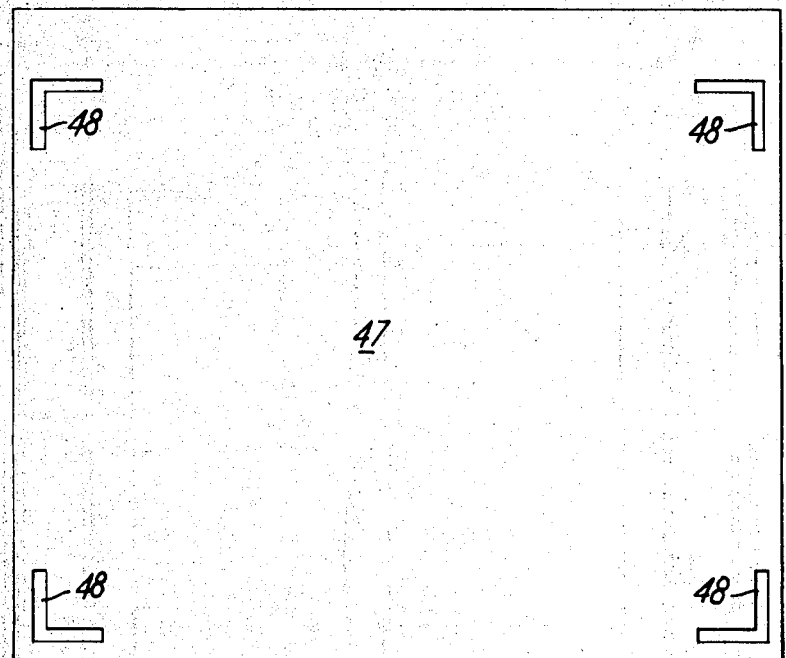

FIG. 9 shows in plan view and to a larger scale the floor 47 of the container 5. The floor 47 has adjacent each corner a right-angled socket 48 in each of which an end portion of an upright angle member, not shown, is inserted. The angle members are interconnected at their lower ends by further angle members, not shown, and the latter are secured to the floor, for example, by bolts. The roof of the container is connected to the upright angle members in a similar manner. The front and rear panels and one side panel of the container 5 fit into slots provided at two corners between the upright angle members and outer upright members extending parallel thereto. At the other two corners, the side panels are located in slots between the upright angle members and side plates, and the leaves of hinges of doors which form the other sidewall of the container are also located in said slots. The sockets 48 at one side of the floor 47 are preferably spaced, as shown in FIG. 9, further from the side edge of the floor than are the sockets 48 at the other side spaced from that side edge.

Figure 10:
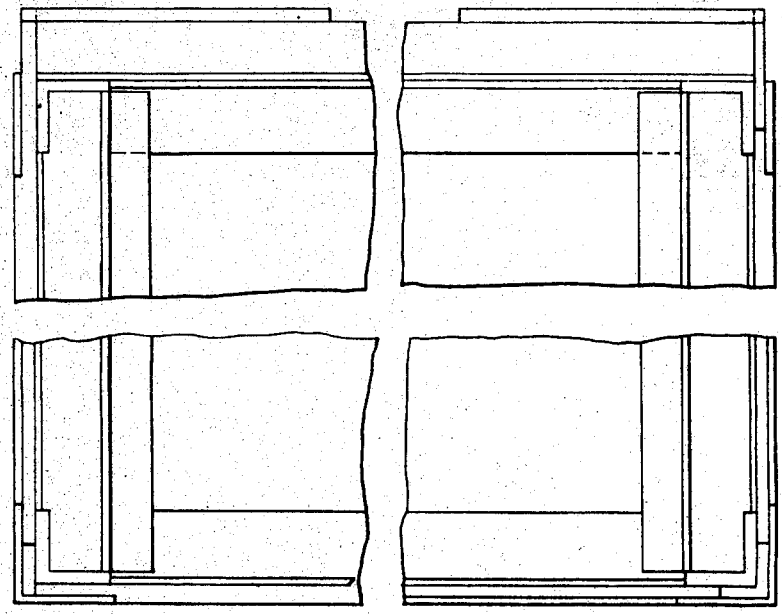
Figure 11:
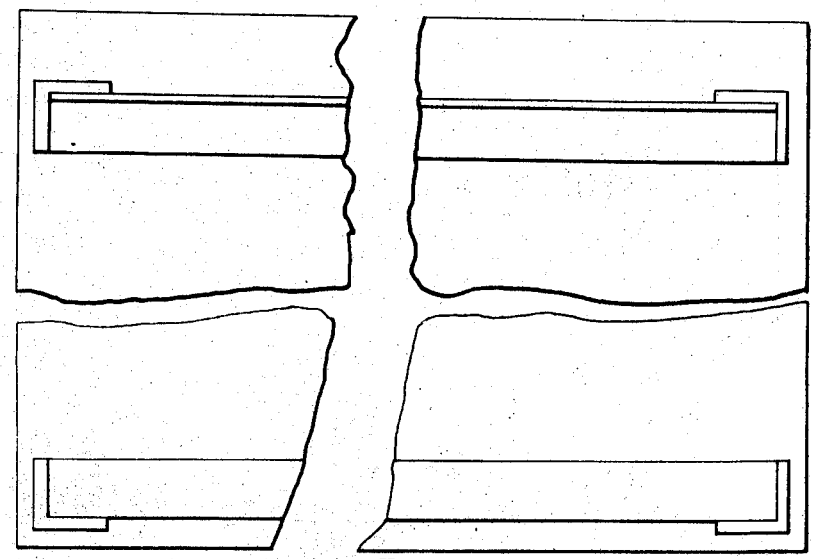

FIGS. 10 and 11 are fragmentary plan views showing details of a container as above described.

The gearing for interconnecting the gates 33, 34, may be replaced by a lever system, and stops may be provided for limiting movement in each direction.

Instead of two castor wheels 6A, the container may have only one such wheel midway between its sides.

Reference will now be made to FIGS. 12 to 16.

Figure 13:
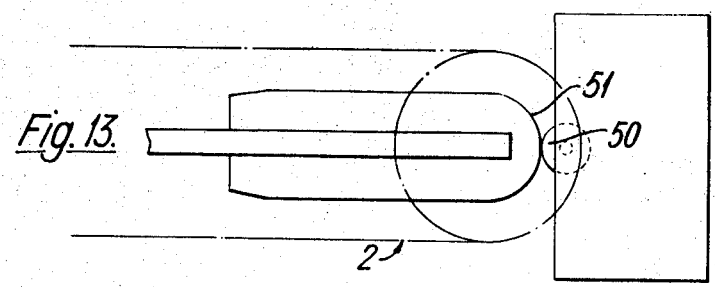
Figure 12:
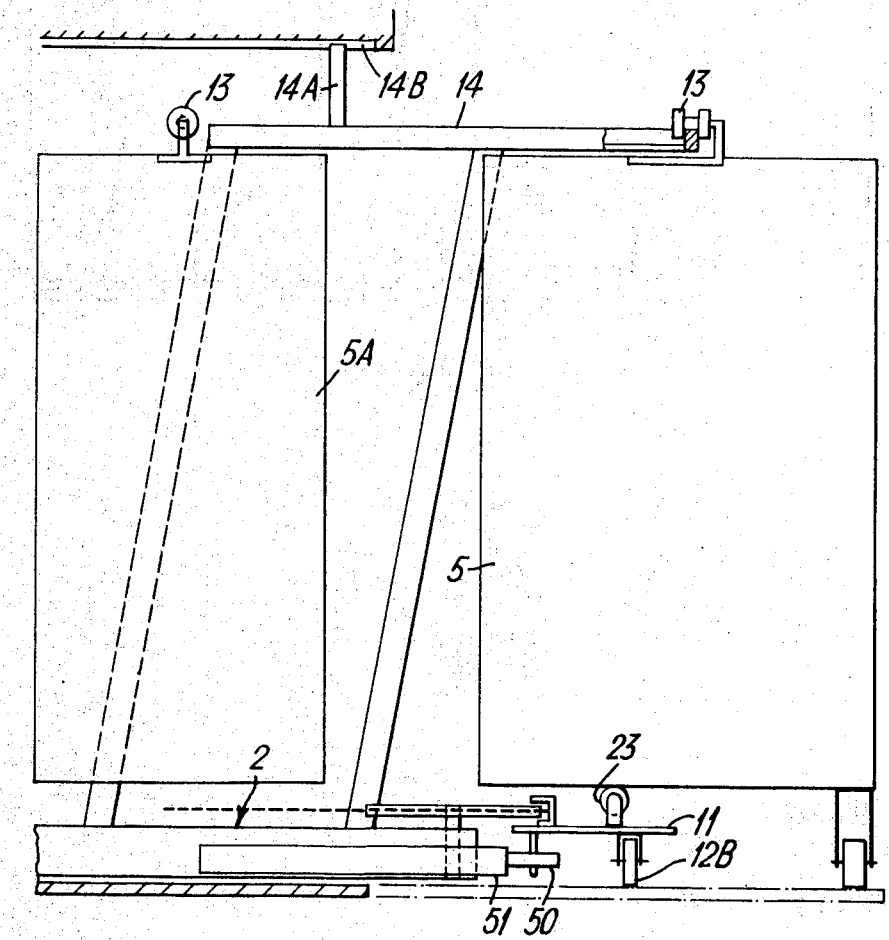
Figure 14:
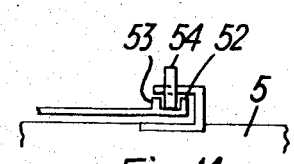

FIG. 12 shows in side view a rear portion of the conveyor 2 and two adjacent containers 5 and 5A, the conveyor 2 being in its operative position, and the container 5 being the rearmost container. In this position of the conveyor 2, when the van has a tailgate which hinges downwards to form an extension of the platform 3, the carriers 11 ride on the tailgate in their rearmost position. In the embodiment shown in FIG. 12, provision is made for supporting the containers in their rearmost position when there is no such tailgate or a short tailgate, as will now be described. The substantially U-shaped rail 14 located above the level of the containers extends around the rear end of the conveyor 2 and cooperates with a flanged wheel 13 mounted either on upstanding extensions 49 of each carrier 11 (FIG. 3) or on the roof of each container (FIGS. 12 and 14). Thus, as each container 5 or carrier 11 approaches the end of the conveyor 2 its wheel 13 engages and runs on the rail 14, so that the container is thus suspended when there is no tail gate. The carrier 11 is supported against downward pivoting by a wheel 50 on the carrier 11, the wheel 50 having an upright rotary axis and engaging a rail 51 on the conveyor frame (FIG. 13).

In this way, the van may have a relatively inexpensive rear door or doors, such as side hinged doors, a top hinged door, a door of the "up and over" type or a roller-type door.

The rail 14 may have a pin or pins 14A running in a channel 14B on the roof of the van.

Figure 15:
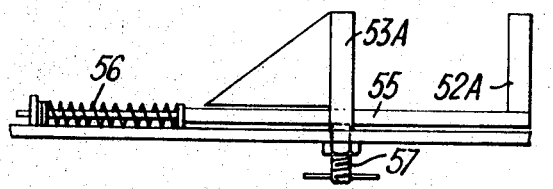
Figure 16:
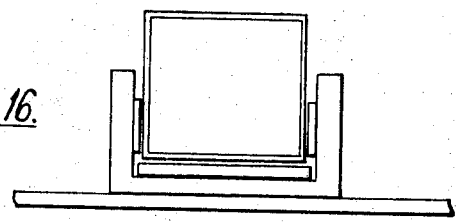

FIG. 14 shows in fragmentary end view a modification of the FIG. 12 embodiment, in which the rail 14 and the flanged wheel 13 are replaced respectively by a track having flanges 52, 53 and a roller 54. In this case, a rearmost part 52A of the outer flange 52 (FIG. 15) is movable inwards relative to a separate part 53A of the flange 53 so as to abut the flange 53A and provide a rear gap in the flange 52 through which the roller 54 may pass and thus allow the containers to be unloaded at the rear, if desired. As shown in FIG. 15, the part 52A is carried by a slide 55 which is urged by a spring 56 to a position in which the part 52A in continuous with the flange 52, and a clamp 57 on the part 53A is provided for locking the slide 55 in its extended and retracted position. The track 52, 53 may extend fully around the conveyor, and, in this case, a similar arrangement to that described with reference to FIG. 15 is provided at one side for side loading and unloading.

In the case that loading and unloading has to take place at the rear of the van, a lever system 32 (FIG. 4) is provided also at the rear of the van.

When a device is provided for taking up slack or wear in the conveyor chain, said device is so arranged that the rear sprocket for the conveyor chain is not moved relative to the rail 14 or the track 52, 53.

The flange 53 of the track 52, 53 is not essential and may be omitted.

Extra brackets and an extra sliding piece on which the conveyor frame or boom runs may be provided at the rear. Each bracket may be in the form of a channel member as shown at 58 in FIG. 16.

As already described the van has a gate lift 7 at one side, the gate or floor 9 of the lift being formed by a portion 10 of the load carrying platform 3 of the van and being carried by telescopic members 58 and 59 so that it may be guided between a raised position in which it is flush with the van platform, and a lowered position in which it is substantially at ground level.

Figure 17:
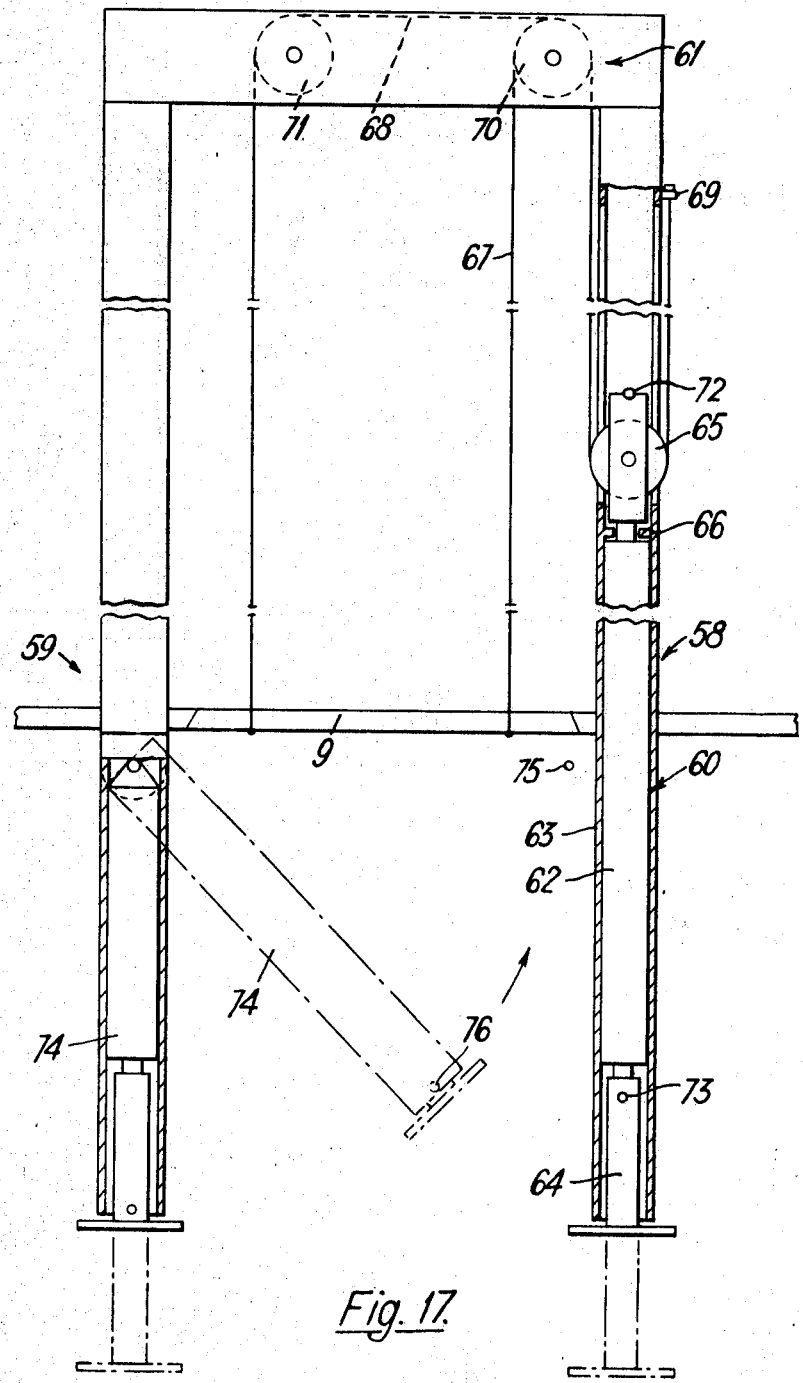

Referring to FIGS. 3 and 17, raising and lowering of the gate 9 is effected by a hydraulic piston and cylinder unit 60 through a rope and pulley system 61. The cylinder 62 of said unit 60 is mounted in the upper tubular part 63 of the telescopic member 58 so as to be slidable between an upper limit position in which it abuts the upper end of said tubular part, and a lower limit position in which it expands the telescopic member so that its other part 64 engages the ground. The rope and pulley system 61 has a pulley 65 on the piston rod 66 of the unit 60, and two ropes 67, 68 pass from an anchorage 69 above the unit down and around said pulley 65. The ropes then pass up and around a second pulley 70 and the rope 67 passes downwards and is anchored to one end of the gate 9. The other rope 68 passes over a third pulley 71 spaced from the second pulley 70, and the rope 68 extends downwards from the third pulley 71 and is anchored to the other end of the gate 9. A first pin 72 holds the piston rod 66 of the unit 61 against movement, and a second pin 73 holds the parts of the telescopic member 58 against expansion. The telescopic member 59 has a telescopic leg 74 which is pivotally connected at one end to the van platform 3 and it extends below and across the gate 9 and is held in position by a third pin 75. The leg 74 in this position supports the gate 9 or acts as a safety catch therefor. By withdrawing the third pin 75, the leg 74 can be pivoted into a vertical position, and the leg 74 can be expanded into engagement with the ground upon withdrawal of a fourth pin 76 which locks the upper and lower telescopic parts of the leg together in their contracted position.

As above described, the gate is in its raised out-of-use or road travel position, and the operation of lowering the gate will now be described.

The telescopic leg 74 is swung down to its vertical position. The unit 60 with the second pin 73 removed, is then operated so that the cylinder 62 moves downwards pushing the lower part 64 of the telescopic member 58 into contact with the ground and raising the chassis of the van slightly. The said fourth pin 76 is withdrawn, so that the lower part of the telescopic leg 74 lowers under gravity, or by being manually pulled, into engagement with the ground. The fourth pin 76 is then reinserted to hold the telescopic leg 74 so expanded. The second pin 73 is then reinserted to hold the lower part 64 of the telescopic member 58 in engagement with the ground, after, if necessary, further adjustment of the unit. The latter is then operated so that the cylinder 62 moves to its upper limit position. The first pin 72 is then removed to release the piston rod 66, and the unit 60 is again operated so that the piston rod 66 moves upwards carrying the first pulley 65 with it so that the gate 9 then moves down to its lowered position at ground level. The gate 9 can be raised by reversing the stroke of the piston of the unit.

When the loading or unloading operation is finished, the gate 9 is returned to its raised position, and the first pin 72 is replaced to hold the piston against movement. The unit 60 is then operated so that the cylinder 62 abuts the lower part 64 of the telescopic member 58 and so that the second pin 73 can be withdrawn. After withdrawal of the second pin 73, the unit 60 is then operated so that the load is taken from the telescopic leg 74 and the fourth pin 76 is removed, the lower part of the leg 74 is pushed in manually, the pin 76 replaced, and the leg is then swung up into position below the gate. The unit 60 is then operated so that the cylinder 62 moves to its upper limit position, and the lower part 64 of the telescopic member 58 is pushed manually into its collapsed position and the second pin 73 is then reinserted.

In an alternative embodiment, the telescopic leg is replaced by a second and similar piston and cylinder unit, each having a rope and pulley system as first described and connected respectively to opposite ends of the gate. The rope and pulley systems may be replaced by chain and sprocket systems.

Figure 18:
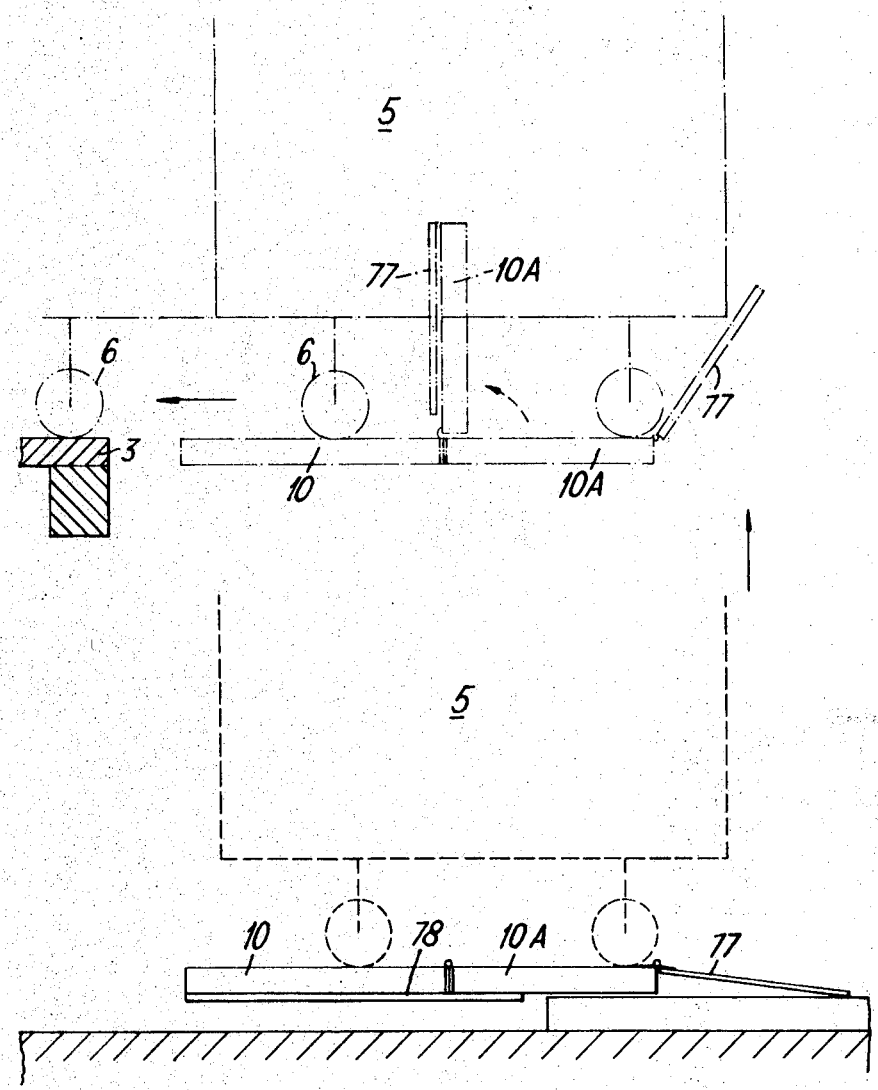
Figure 19:
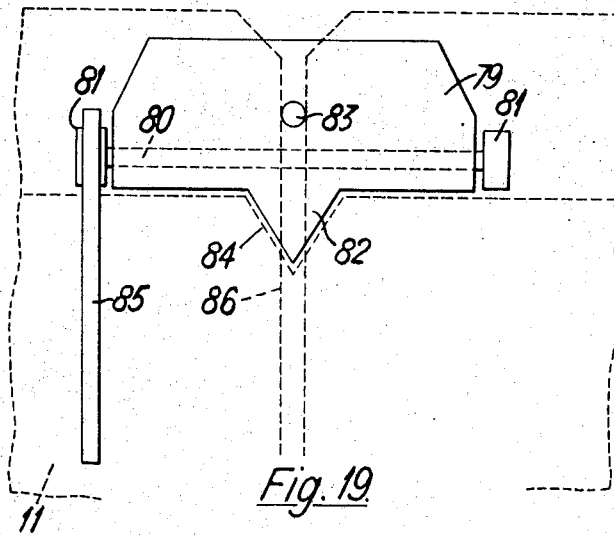
Figure 20:
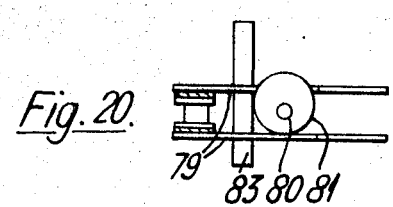
Figure 21:
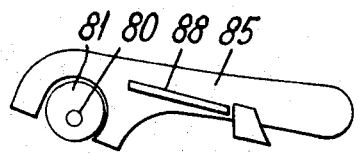
Figure 22:
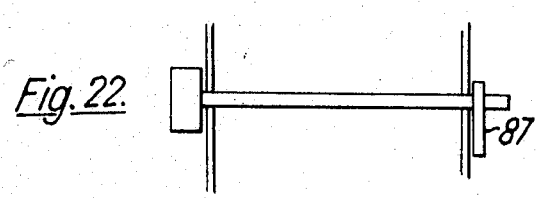
Figure 23:
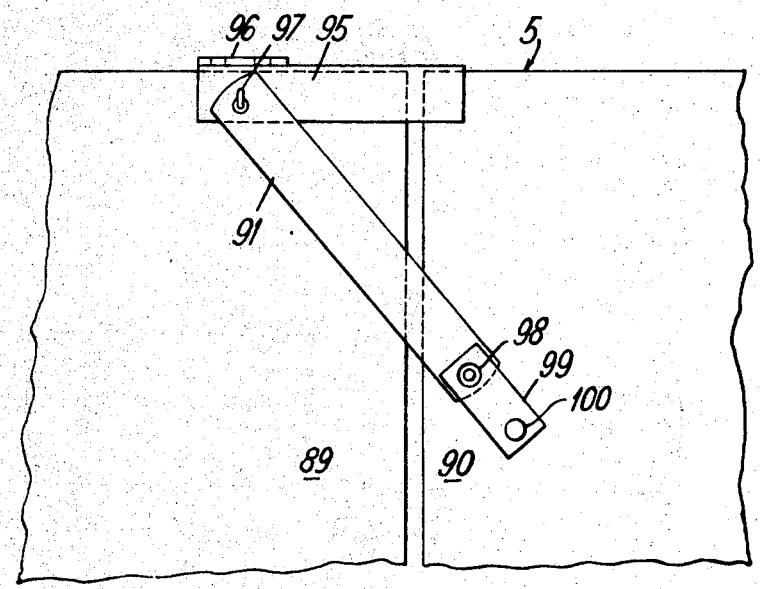

The gate may have a hinged extension 10A which has a hinged flap 77 (FIG. 18) which forms a ramp when the gate is in its lowered position.

The wheels of the containers 5 or carriers 11 may be guided between inner and outer rails on the van platform 3, and the said flap 77 in the out-of-use position of the gate acts as part of the outer rail. That is to say, the extension of the gate 10A is swung upwards to a vertical position and the flap 77 is swung inwards and downwards against the extension 10A. The gate 9 carries a lower plate 78 which projects beyond the outer edge of the gate 9 and supports the extension 10A in the in-use position.

In a modification the carriers 11 are mounted on the conveyor 2 as follows. Referring to FIGS. 19 to 22, the conveyor chain 18 has a series of pairs of upper and lower plates 79, each pair being connected to a link of the chain 18 and projecting laterally and outwardly therefrom. The plates 79 carry between them a rotatably adjustable shaft 80 extending parallel to the chain and carrying an eccentric cam 81 at each end of the plates 79. The plates 79, at their outermost edges carry a central triangular projection 82, and also carry an upright guide pin 83. The edge of a carrier 11 opposite and adjacent the chain, in use, has a V-shaped notch 84 corresponding to said triangular projection 82 and on opposite sides of the notch 84 carries pivoted spring-loaded latches 85 for engaging said cams 81. The carrier 11 also has a guideway 86 in line with the notch 84 and at right angles to the edge having the notch.

In use, each carrier 11 is connected to the conveyor chain 18 by pushing it towards the chain so that the guide pin 83 is engaged by the guideway 86 and the carrier 11 is so guided that the triangular projection 82 on the plates 79 and the notch 84 on the carrier 11 engage, and the latches 85 engage the cams 81. The cams 81 are then rotated by a lever 87 (FIG. 22) to hold the latches 25 more firmly in position. The latches 85 engage the cams 81 automatically by moving up ramps 88 and then dropping off these on to the cams 81. Unloading is effected in the reverse manner, the latches 85 first being lifted clear of the cams 81.

Figure 24:
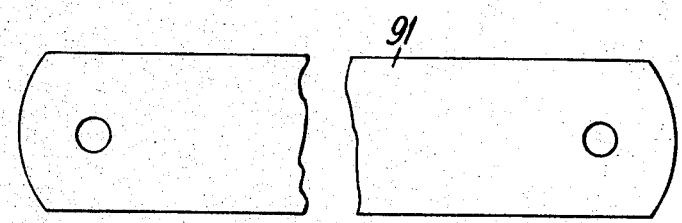

Each container 5 is provided with means for attaching a sealing strip so that unauthorized or accidental opening of the container may be easily detected. Referring to FIGS. 23 to 26 the container 5 has two oppositely opening hinged doors 89, 90, and means for attaching a sealing strip 91 (FIG. 24). The said means consists of a device 92 for holding the doors closed, and a releasable fastener 93. The device 92 consists of an angle member which has one arm 94 secured to the top wall of the container, and its other arm 95 angled and abutting said top wall and the front faces of the doors 89, 90 so as to hold them closed, and connected to the arm 94 by a hinge 96. The arm 95 has on its front face an upwardly directed hook 97. The fastener 93 consists of a pin 98 projecting from the front face of the door 90, and a latch which is engaged with the pin 98 when a sealing strip 91 is applied, as shown in FIG. 1. The latch consists of an arm 99 secured at one end to a shaft 100 which is pivotally mounted and axially slidable in the door 90 and projects therethrough to both sides. In the position shown, the shaft 100 is held against turning, and against sufficient axial movement for the arm 99 to move clear of the pin 98, the arm 99 having a hole 101 in which the pin 98 engages. This is effected by a slide member 102 having a hole 103 through which the pin 100 passes, the hole 103 being sufficiently large to allow the member 102 to drop so that a marginal portion of the member 102 above the hole 103 engages in a slot 104 in the pin 100, the slot 104 having a flat bottom. The slide member 102 is guided between the back face of the door 90 and a bracket 105 secured to the door 90. Prior to the fastener 93 having been adjusted to the position shown, the paper sealing strip 91, which has a hole at each end, is attached to the hook 97 and the pin 98, and it will be seen that the doors 89, 90 cannot be opened without breaking the sealing strip 91, so that unauthorized or accidental opening of the doors can be easily detected.

When the container 5 has to be opened by an authorized person, the latter simply breaks the strip 91, lifts the arm 95 of the device 92 clear of the doors 89, 90 and opens them. When the container 5 has been emptied and repacked, the door 89 is closed, the slide member 102 is pushed upwards to clear the slot 104, the pin shaft 100 is pulled outwards so that the innermost end portion 100A of the shaft 100 is engaged by the wall of the hole 103, the hole 101 on the arm 99 is clear of the pin 98, and the arm 99 is turned to one side of the pin 98. The door 90 is then closed, the arm 95 is hinged back to the position shown in FIGS. 23 and 25, and a fresh sealing strip is engaged by its holes on the hook 97 and the pin 98. The arm 99 is then turned so that the hole 101 is registered with the pin 98, and the shaft 100 is pushed inwards, so that the slide member 102 drops back to the position shown, and the doors 89, 90 cannot be opened without breaking the strip 91.

The shaft 100 has a circular end stop 106 which prevents complete withdrawal of the shaft 100 through the member 102, when the fastener 93 is moved to its unlatched condition, and the slide member 102 may be urged by a spring 106, FIG. 25 to the position shown in FIG. 26.

The sealing strip 91 may be made of material other than paper for example plastics or metal, but paper is preferred because it is cheap and its breaking presents no difficulty to authorized persons.

The container may have only one door, and, in this case, the door 89 may be considered to be a fixed part of the container. The invention is also applicable to a container having a sliding door, and in this case, the sliding door could be considered to be the top wall of the container shown, the door being slidable to its open position to the left in FIG. 25.

The invention could also be applied to a container having a lift-off lid, and in this case, the device 92 above described is provided at two opposite sides of the container, and a single fastener 93 is provided on the lid.

When the containers 5 are loaded on the van 1 the doors are at the side of the container so that they are prevented from being opened by an adjacent container.

Figure 27:
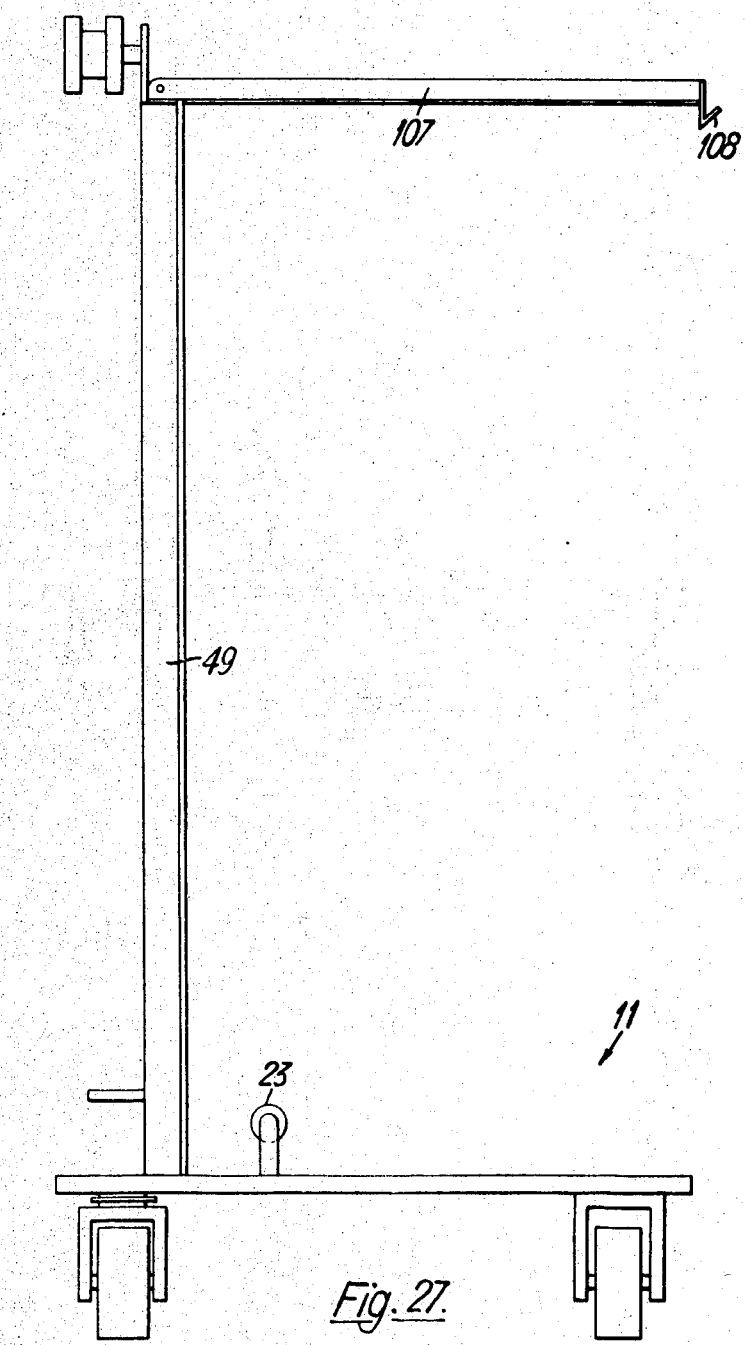

In a further modification the extensions 49 of the carriers 11 have a member 107 (FIG. 27) pivotally connected at their upper end. The member 107 has a hooked portion 108 which is arranged to engage the upper edge of a container 5 and thus prevent toppling thereof.

It will be appreciated that the basic principle of the above-described invention is applicable in other fields, for example, parking of cars in multistorey car parks.

In relation to loading and unloading apparatus and methods hitherto used, a van having a conveyor as above described has the following advantages. Available space may be used to better advantage, there is much less manhandling, there is no need for a crane so that there is also a saving in weight, cost and labour, there is no need to load the containers in any special order for delivery, as at each delivery point, the container can be operated to bring the required container to the gate lift. If the van is carrying a full load at any time, the conveyor can be operated to locate the load in the most suitable position.

While the main object of the invention is to facilitate the loading, unloading and storage in transit of large heavy containers, it is to be understood that the invention may also be used with other goods.

Modifications may be made without departing from the scope of the invention. Where the use of hydraulic power has been mentioned for various drives, it is to be understood that these may alternatively be mechanically or pneumatically operated and the gate lift may be provided at the rear of the van instead of at the side.

The invention is also applicable to air, sea and rail goods vehicles, and the conveyor may also be used on the ground or on a floor for conveying goods from one point to another, or to or from an endless belt conveyor lying at an angle to the present conveyor. In the latter cases, a baffle wall extends at an angle across the adjacent run of the present conveyor towards the belt conveyor, so that goods may be automatically guided from one conveyor to the other. Such an arrangement may, for example, be provided for handling luggage at an airport.

I claim:

1. A load carrying system comprising a vehicle having a load carrying base, an endless conveyor on said base extending fore-and-aft to the base, said conveyor comprising an endless member having side-by-side runs, a pair of head wheels about which said endless member is trained at the ends of said runs, a plurality of wheeled load receptacles, means connecting said load receptacles to said endless member for circulation therewith, wheel means that rollably support on said base the sides of said receptacles that are remote from said endless member, and means for bodily adjusting said head wheels together as a unit in a horizontal direction lengthwise of said runs relative to said base thereby bodily to adjust said endless member in the direction of its runs.

2. A system as claimed in claim 1, said means connecting said receptacles to said endless member comprising wheel devices on which detachably rest the portions of the receptacles that are closest to the endless member, said wheel devices bearing a portion of the weight of the receptacles and rolling on said base.

3. A vehicle as claimed in claim 2, in which each of said devices comprises a carrier having castor wheels running on the base, and means on its upper face for engaging and tilting the base of a wheeled receptacle.

4. A system as claimed in claim 1, said receptacles directly overlying the endless member whereby substantially the whole load space is utilized in a direction transverse to said runs of the endless member.

5. The combination claimed in claim 1, in which each receptacle has two fixedly mounted front wheels and at least one rear castor wheel, the latter runs on the base, and the front of the receptacle is raised by said device so that the front wheels lie clear of the base.

6. The combination claimed in claim 5, in which each of said devices comprises a carrier having castor wheels running on said base and means on its upper face for engaging the base of the receptacle and raising its front end so that the front wheels of the receptacle lie clear of said base.

7. The combination claimed in claim 6, in which means is provided for locking each receptacle to its carrier and said means comprises runners, one at each side of the base of the receptacle, and flanges, one on each runner, which pass below the carrier, and firmly abut the latter when the base of the receptacle is raised by said means.

8. A system as claimed in claim 1, in which said base is a vehicle platform, including a gate lift comprising a gate, a vertically arranged piston and cylinder unit for raising and lowering the gate through a rope and pulley system, a telescopic ground engageable support, the cylinder of said unit being mounted in the upper tubular part of a telescopic member and being slidable between an upper limit position, and a lower limit position in which it urges the other part of the tubular member into a ground engaging position, and means for releasably locking the piston of the unit against movement and said other part of the telescopic member in its ground engaging position.

9. A system as claimed in claim 8, in which said support is a telescopic leg which is pivotal between a lowered ground engaging position and a raised out-of-use position in which it extends across and below the gate and supports the latter or acts as a safety catch therefor.

10. A system as claimed in claim 8, in which said support is another and similar piston and cylinder.

11. A system as claimed in claim 1 each of said receptacles having a door and means for the purpose of attaching a sealing strip so that unauthorized or accidental opening thereof may be easily detected, said means comprising a device for holding the door closed and displaceable so as to permit opening of the door and carrying a connector for one end of a sealing strip, and a releasable fastener for the other end of the sealing strip, said device with its connector and said fastener being so arranged on the receptacle that, when they are connected by a sealing strip, the latter extends across the free end of the door, and said device being displaceable only in a direction away from said fastener to permit opening of the door, and the fastener being releasable only from inside the receptacle, so that the door cannot be opened without the sealing strip being broken.

12. A system as claimed in claim 1, in which said base is a vehicle platform, a gate lift is provided at one side of the base and comprises a gate forming part of said base, and means movable with the conveyor is provided for supporting the receptacles when they project beyond the rear of the platform when the conveyor is in its operative position.

13. A load carrying system comprising a vehicle having a load carrying base, an endless conveyor on said base extending fore-and-aft of the base, said conveyor comprising an endless member having side-by-side runs, a pair of head wheels about which said endless member is trained at the ends of said runs, a plurality of wheeled load receptacles, means connecting said load receptacles to said endless member for circulation therewith, wheel means that rollably support on said base the sides of said receptacles that are remote from said endless member, and means for bodily adjusting said head wheels together as a unit in a horizontal direction lengthwise of said runs relative to said base thereby bodily to adjust said endless member in the direction of its runs, said system further including a gate lift comprising a gate, a vertically arranged piston and cylinder unit for raising and lowering the gate through a rope and pulley system, a telescopic ground engageable support, the cylinder of said unit being mounted in the upper tubular part of a telescopic member and being slidable between an upper limit position, and a lower limit position in which it urges the other part of the tubular member into a ground engaging position, and means for releasably locking the piston of the unit against movement and said other part of the telescopic member in its ground engaging position.

14. A system as claimed in claim 13, in which said support is a telescopic leg which is pivotal between a lowered ground engaging position and a raised out-of-use position in which it extends across and below the gate and supports the latter or acts as a safety catch therefor.

15. A system as claimed in claim 13, in which said support is another and similar piston and cylinder.

16. A load carrying system comprising a vehicle having a load carrying platform, an endless conveyor on said platform extending fore-and-aft of the platform, said conveyor comprising an endless member having side-by-side runs, a pair of head wheels about which said endless member is trained at the ends of said runs, a plurality of wheeled load receptacles, means connecting said load receptacles to said endless member for circulation therewith, wheel means that rollably support on said platform the sides of said receptacles that are remote from said endless member, means for bodily adjusting said head wheels together as a unit in a horizontal direction lengthwise of said runs relative to said platform thereby bodily to adjust said endless member in the direction of its runs, a gate lift provided at one side of the platform comprising a gate forming part of said platform, and means movable with the conveyor provided for supporting the receptacles when they project beyond the rear of the platform when the conveyor is in its operative position.

17. In a load carrying system comprising a load carrying base, an endless conveyor on said base extending fore-and-aft of the base, an endless member in said conveyor having side-by-side runs, and a series of devices on said endless member for connecting wheeled load receptacles thereto; the improvement in which said base is a vehicle platform, a gate lift carried by said platform and comprising a gate, a vertically arranged piston and cylinder unit for raising and lowering the gate through a rope and pulley system, a telescopic ground engageable support, the cylinder of said unit being mounted in the upper tubular part of a telescopic member and being slidable between an upper limit position and a lower limit position in which it urges the other part of the tubular member into a ground engaging position, and means for releasably locking the piston of the unit against movement and said other part of the telescopic member in its ground engaging position.